United States Patent
Huang et al.

(10) Patent No.: US 10,296,434 B2
(45) Date of Patent: May 21, 2019

(54) BUS HANG DETECTION AND FIND OUT (71) Applicant: QUANTA COMPUTER INC., Taoyuan (TW)

(72) Inventors: Chih-Chia Huang, Taoyuan (TW); Ming-Chih Hsiao, Taoyuan (TW)

(73) Assignee: Quanta Computer Inc., Taoyuan (TW)

( * ) Notice: Subject to any disclaimer, the term of this patent is extended or adjusted under 35 U.S.C. 154(b) by 84 days.

(21) Appl. No.: 15/408,196

(22) Filed: Jan. 17, 2017

(65) Prior Publication Data
US 2018/0203779 A1 Jul. 19, 2018

(51) Int. Cl.
| G06F 11/00 | (2006.01) |
| G06F 11/30 | (2006.01) |
| G06F 13/42 | (2006.01) |
| G06F 11/07 | (2006.01) |

(52) U.S. Cl.
CPC ...... *G06F 11/3027* (2013.01); *G06F 11/0703* (2013.01); *G06F 11/0715* (2013.01); *G06F 11/0751* (2013.01); *G06F 11/3048* (2013.01); *G06F 11/3051* (2013.01); *G06F 13/4282* (2013.01)

(58) Field of Classification Search
CPC ......... G06F 2213/0016; G06F 11/0772; G06F 11/221; G06F 13/1684; G06F 1/24; G06F 13/4282; G06F 11/07
See application file for complete search history.

(56) References Cited

U.S. PATENT DOCUMENTS

| 5,333,285 | A | * | 7/1994 | Drerup | G06F 11/1415 714/23 |
| 6,112,320 | A | * | 8/2000 | Dien | G06F 11/0757 714/51 |
| 6,260,162 | B1 | * | 7/2001 | Typaldos | G06F 11/0757 714/25 |
| 6,728,908 | B1 | * | 4/2004 | Fukuhara | H04L 1/0061 714/43 |

(Continued)

FOREIGN PATENT DOCUMENTS

| CN | 101126995 A | 2/2008 |
| TW | 201445300 A | 12/2014 |
| TW | 201640363 A | 11/2016 |

OTHER PUBLICATIONS

Extended European Search Report for EP Application No. 17177547.1, dated Feb. 12, 2018.

(Continued)

*Primary Examiner* — Loan L. T. Truong
(74) *Attorney, Agent, or Firm* — Nixon Peabody LLP; Zhou Lu (57) ABSTRACT

A method of monitoring I2C bus status using a Baseboard Management Controller (BMC) and a hardware watchdog (HW) circuit is provided. The method includes detecting, using the HW circuit, a failure of an I2C bus and determining if the HW circuit can auto reset I2C devices on the I2C bus. The method also includes, if it is determined that the HW circuit can auto reset the I2C devices on the I2C bus, resetting, using the HW circuit, the I2C devices, and if it is determined that the HW circuit cannot auto reset the I2C devices on the I2C bus, reporting, using the HW circuit, detected failure to the BMC. The method further includes processing, using the BMC, the detected failure.

14 Claims, 5 Drawing Sheets

(56) References Cited

U.S. PATENT DOCUMENTS

| | | | |
|---|---|---|---|
| 6,862,642 B1* | 3/2005 | Packer | G06F 11/0745 326/9 |
| 7,154,723 B1 | 12/2006 | Warnakulasooriya et al. | |
| 7,194,665 B2* | 3/2007 | Gulick | G06F 11/2268 714/47.1 |
| 7,350,117 B2* | 3/2008 | Garcia | G06F 9/526 714/55 |
| 7,529,983 B2* | 5/2009 | Wagner | G06F 11/0757 714/34 |
| 7,958,396 B2* | 6/2011 | Chitsaz | G06F 11/0757 714/26 |
| 8,448,029 B2* | 5/2013 | Snead | G06F 11/0724 714/55 |
| 8,555,118 B2* | 10/2013 | Zhang | H04L 41/0659 714/55 |
| 8,595,560 B2* | 11/2013 | Yuuki | G06F 11/0724 714/38.1 |
| 9,566,920 B2* | 2/2017 | Melzl | G06F 1/28 |
| 9,880,894 B2* | 1/2018 | Wang | G06F 11/0736 |
| 10,006,455 B2* | 6/2018 | Tajima | G06F 11/07 |
| 10,067,906 B2* | 9/2018 | Lee | G06F 13/4282 |
| 10,089,164 B2* | 10/2018 | Curtis | G06F 11/0721 |
| 2002/0046362 A1* | 4/2002 | Bolz | G05B 9/03 714/23 |
| 2002/0108076 A1* | 8/2002 | Barenys | G06F 11/221 714/43 |
| 2003/0204792 A1* | 10/2003 | Cahill | G06F 11/0757 714/55 |
| 2004/0081079 A1* | 4/2004 | Forest | H03M 13/43 370/216 |
| 2004/0168008 A1* | 8/2004 | Benson | G06F 13/409 710/306 |
| 2004/0177194 A1* | 9/2004 | Benson | G06F 13/387 710/300 |
| 2004/0252642 A1* | 12/2004 | Larson | G06F 11/2221 370/235 |
| 2004/0267999 A1* | 12/2004 | Larson | G06F 11/0727 710/301 |
| 2005/0179546 A1* | 8/2005 | Lanigan | G07C 9/00166 340/545.6 |
| 2005/0233724 A1* | 10/2005 | Van Lammeren | G06F 21/57 455/333 |
| 2005/0262395 A1 | 11/2005 | Yang et al. | |
| 2006/0242348 A1* | 10/2006 | Humphrey | G06F 13/4291 710/305 |
| 2007/0088988 A1* | 4/2007 | Gupta | G06F 11/2268 714/48 |
| 2007/0240019 A1* | 10/2007 | Brady | G06F 13/4291 714/43 |
| 2008/0126852 A1 | 5/2008 | Brandyberry et al. | |
| 2008/0165780 A1* | 7/2008 | Aldaz | H04W 52/0229 370/392 |
| 2008/0270827 A1 | 10/2008 | Brandyberry et al. | |
| 2008/0307240 A1* | 12/2008 | Dahan | G06F 1/06 713/320 |
| 2009/0006889 A1 | 1/2009 | Holdaway et al. | |
| 2012/0084596 A1* | 4/2012 | Chen | G06F 11/0745 714/2 |
| 2013/0024719 A1* | 1/2013 | Zhang | H04L 41/0659 714/4.11 |
| 2013/0165177 A1* | 6/2013 | Berg | H04W 24/04 455/524 |
| 2013/0339566 A1* | 12/2013 | Ueki | G06F 11/2033 710/316 |
| 2015/0046746 A1 | 2/2015 | Messer | |
| 2015/0058660 A1* | 2/2015 | Baker | G06F 11/1415 714/5.1 |
| 2015/0156089 A1* | 6/2015 | Mc Cleland | H04L 43/08 307/1 |
| 2015/0286607 A1* | 10/2015 | Cvejanovic | G06F 11/3055 710/110 |
| 2015/0347336 A1* | 12/2015 | Uekuri | G06F 1/3206 710/316 |
| 2015/0356034 A1* | 12/2015 | Pamley | G06F 13/1684 710/308 |
| 2016/0004659 A1* | 1/2016 | Otoshi | G06F 13/4022 710/310 |
| 2016/0335149 A1 | 11/2016 | David | |
| 2016/0357701 A1* | 12/2016 | Lee | G06F 13/4282 |
| 2017/0147453 A1* | 5/2017 | Huang | G06F 11/2007 |
| 2017/0249156 A1* | 8/2017 | Frey | G06F 9/441 |
| 2017/0308433 A1* | 10/2017 | Kwon | G11C 29/52 |

OTHER PUBLICATIONS

Taiwanese Office Action for Application No. 106106085, dated Feb. 14, 2018, w/ First Office Action Summary.

Taiwanese Search Report for Application No. 106106085 (report conducted Feb. 13, 2018) dated Feb. 14, 2018.

JP Office Action for Application No. 2017-177846, dated Oct. 30, 2018, w/ First Office Action Summary.

* cited by examiner

BUS HANG DETECTION AND FIND OUT

FIELD

This application relates to bus hang detection, and more specifically bus hang detection using a Baseboard Management Controller (BMC) along with a hardware watchdog (HW) circuit, which is a complex programmable logic device (CPLD).

BACKGROUND

An Inter-Integrated Circuit (I2C) bus hang may occur because of several reasons, such as high Ethernet traffic or server crash. Typically, I2C bus hang detection is performed using an I2C device's software. However, such solutions may be very slow and expend tremendous system memory and CPU resources.

Figure 1:
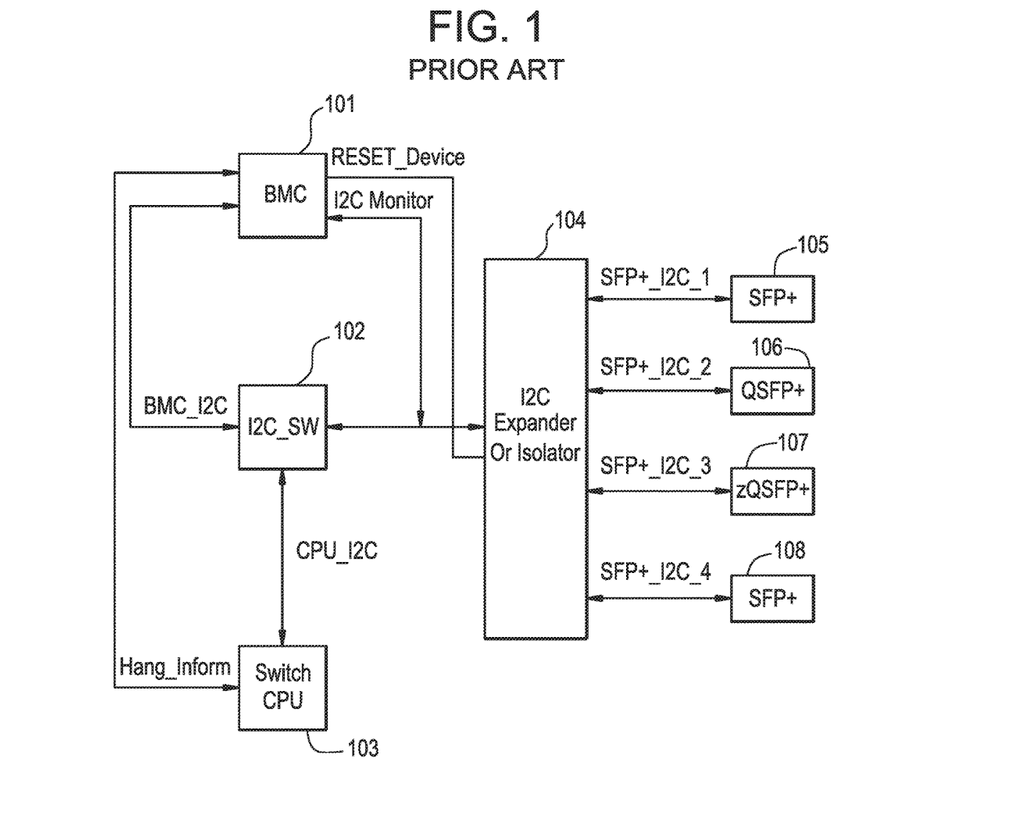
FIG. 1 illustrates a block diagram of a system where BMC monitors the I2C hang device directly, in the prior art.

A generic I2C structure, as depicted in FIG. 1, incorporates a BMC directly monitoring the I2C device. Although such a configuration does not require system resources and CPU resources, such a monitoring method consumes BMC resources. Furthermore, a software solution opens the network up to cyber-attacks.

Accordingly, there is a need for another solution for detection and processing of I2C bus hang.

SUMMARY

The following presents a simplified summary of one or more embodiments in order to provide a basic understanding of present technology. This summary is not an extensive overview of all contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later.

In a first embodiment, there is provided a method of monitoring I2C bus status, using a Baseboard Management Controller (BMC) and a hardware watchdog (HW) circuit. The method includes detecting, using the HW circuit, a failure of an I2C bus and determining if the HW circuit can auto reset I2C devices on the I2C bus. The method also includes, if it is determined that the HW circuit can auto reset the I2C devices on the I2C bus, resetting, using the HW circuit, the I2C devices, and if it is determined that the HW circuit cannot auto reset the I2C devices on the I2C bus, reporting, using the HW circuit, detected failure to the BMC. The method further includes processing, using the BMC, the detected failure.

In the method, the determining further includes detecting, at the HW circuit, whether a reset enable signal was received from the BMC, and determining that the HW circuit can auto reset the I2C device if the reset enable signal was received.

In the method, the detecting can further include monitoring, using the HW circuit, the clock line/data line (SCL/SDA pin) of the I2C bus.

In the method, the processing further includes resetting, using the BMC, the I2C devices, and if the resetting of the I2C device fails to resolve the failure of the I2C bus, testing the I2C device to determine a cause of the failure of the I2C bus. The processing further includes evaluating, in turn, each one of the I2C devices by: isolating the selected one of the I2C devices, checking the I2C bus status after the isolating, and recording, if it is determined for the one of the I2C devices that the I2C bus status is not OK, a failure for the one of the I2C devices. The evaluating can be performed for all channels associated with a selected one of the I2C devices.

In the method, the processing can further include informing the processing results to a CPU.

In a second embodiment, a switch device is provided. The switch device can include a Baseboard Management Controller (BMC), a hardware watchdog (HW) circuit, an I2C bus for connecting I2C devices thereto, and a CPU. In the switch device, the HW circuit is configured for detecting, using the HW circuit, a failure of an I2C bus, determining if the HW circuit can auto reset I2C devices on the I2C bus, resetting, using the HW circuit, the I2C devices if it is determined that the HW circuit can auto reset the I2C devices on the I2C bus and reporting, using the HW circuit, detected failure to the BMC if it is determined that the HW circuit cannot auto reset the I2C devices on the I2C bus, and processing, using the BMC, the detected failure.

In the switch device, the HW circuit can be further configured for detecting, at the HW circuit, whether a reset enable signal was received from the BMC, and determining that the HW circuit can auto reset the I2C device if the reset enable signal was received.

In the switch device, the HW circuit can be further configured to monitor the clock line/data line (SCL/SDA pin) of the I2C bus.

In the switch device, the BMC is further configured for resetting the I2C devices, and if the resetting of the I2C device fails to resolve the failure of the I2C bus, testing the I2C devices to determine a cause of the failure of the I2C bus. The testing can further include evaluating, in turn, each one of the I2C devices by isolating the one of the I2C devices, checking the I2C bus status after the isolating, and recording, if it is determined for the one of the I2C devices that the I2C bus status is not OK, a failure for the one of the I2C devices. The BMC can also be configured to, if it is determined that the HW circuit cannot auto reset the I2C bus, process the I2C bus failure for all channels associated with the one of the I2C devices.

In the switch device, the BMC can be further configured to report the processing results to the CPU.

BRIEF DESCRIPTION OF THE DRAWINGS

These and other sample aspects of the present technology will be described in the detailed description and the appended claims that follow, and in the accompanying drawings, wherein:

DETAILED DESCRIPTION

The subject disclosure provides techniques for managing network configurations in a server system, in accordance with the subject technology. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As discussed above, there is significant interest in developing an alternative to software based or even BMC-based solutions for detecting and processing I2C bus hang that are faster and that do not require significant memory or processing resources. In view of the foregoing, the present disclosure describes bus hang detection using illustration depicted in FIGS. 1-4.

FIG. 1 illustrates a block diagram of a system where BMC monitors the I2C hang device directly, in the prior art.

FIG. 1 depicts a switch system that includes a BMC 101, an I2C switch 102, a switch CPU 103, I2C expander/isolator device 104 and a number of small-form factor pluggable modules (SFP Modules) 105-108 associated with the channels of the I2C expander/isolator device 104. The communication between the I2C device 104 and the SFP Modules 105, 106, 107 and 108 is carried out using I2C signals SFP+_I2C_1, SFP+_I2C_2, SFP+_I2C_3 and SFP+_I2C_4, according to an exemplary embodiment.

According to the conventional technology, the BMC 101 communicates, using the BMC_I2C signal, with the I2C switch 102, and provides hang information, using the Hang_Inform signal, to the switch CPU 103, as shown in FIG. 1.

In the system of FIG. 1, the BMC 101 continuously monitors the I2C device 104 (i.e., the I2C bus) and the devices on the I2C expander using the I2C Monitor signal. In the event of an I2C bus hang, the BMC 101 is capable of resetting the I2C device 104 using the RESET_Device signal.

However, since the BMC 101 directly monitors the I2C device 104 to detect hang of an I2C device and determines when to send the reset signal for resetting the hung I2C devices, this uses BMC resources. This may also use the I2C device's software which may require technical person on site for support. Furthermore, as discussed above, such a solution through I2C device software may be very slow and expend tremendous memory and processing resources.

To address the problems with conventional detection and processing of I2C bus hang events, the various embodiments are directed to an improved system in which at least some portions of the detection and processing of I2C bus hang are offloaded to a hardware watchdog (HW) circuit. Such a system can allow for faster detection and processing of I2C bus hang events. This is illustrated in FIG. 2.

Figure 2:
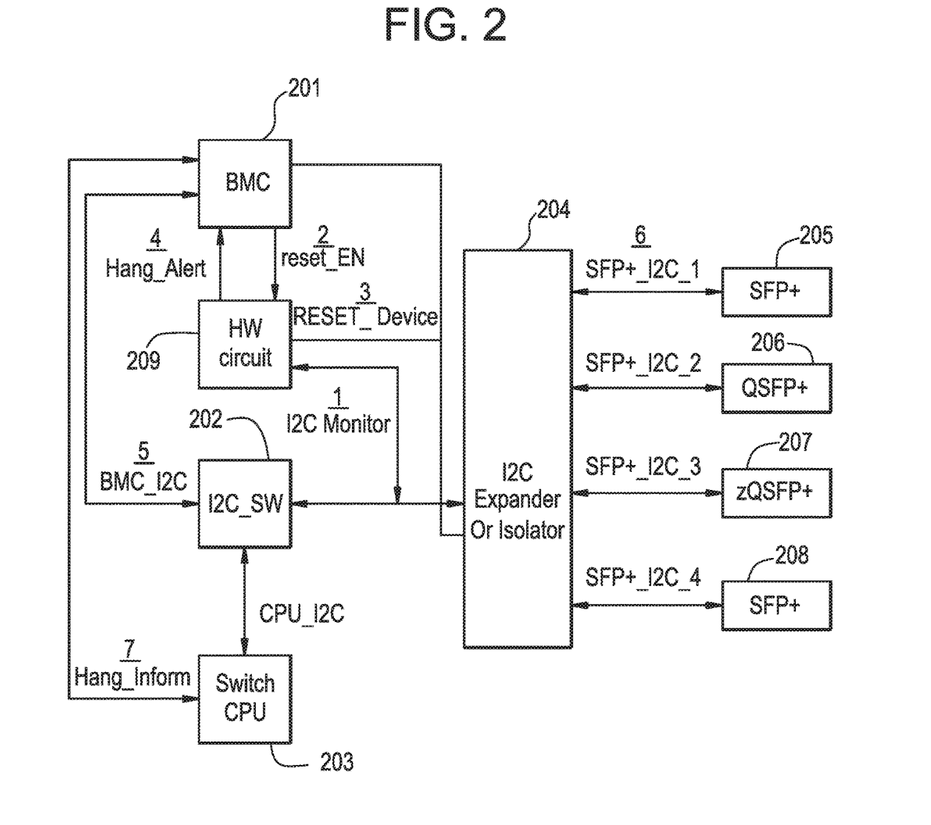
FIG. 2 illustrates a block diagram of a system where BMC works with a hardware watchdog (HW) circuit to monitor the I2C bus status, according to an exemplary embodiment.

FIG. 2 illustrates a block diagram of a system where the BMC works with a HW circuit to monitor the I2C bus status, according to an exemplary embodiment.

Similar to the system of FIG. 1, the system of FIG. 2 includes a BMC 201, an I2C switch 202, a switch CPU 203, I2C expander/isolator device 204, a number of small-form factor pluggable modules 205-208. The communication between the I2C device 204 and the SFP Modules 205, 206, 207 and 208 is carried out in the same manner as above, using I2C signals SFP+_I2C_1, SFP+_I2C_2, SFP+_I2C_3 and SFP+_I2C_4, according to an exemplary embodiment.

However, unlike the system of FIG. 1, the system of FIG. 2 also includes a HW circuit 209 on which at least some portions of the detection and processing of I2C bus hang are offloaded.

As can be seen in the embodiment depicted in FIG. 2, BMC 201 communicates with the I2C Switch 202 using signal BMC_I2C and also provides hang information to the switch CPU 203 using the Hang_Inform signal. However, instead of the BMC 201 directly monitoring the I2C device 204, as in the system of FIG. 1, the HW circuit 209 instead monitors the I2C device 204. The BMC 201 is also configured to communicate a signal, reset_EN, which enables or authorizes the HW circuit 209 to auto reset the I2C device 204. Based on the reset_EN signal, the HW circuit 209 may auto reset the I2C device 204, with appropriate delay, using its own RESET_Device signal.

If the HW circuit 209 is not enabled to auto reset the I2C device 204, the BMC 201 instead receives hang information, via a signal Hang_Alert, from the HW circuit 209.

The HW circuit 209 may further use the I2C Monitor signal to detect the SM/I2C Bus clock line/data line SCL/SDA pin to determine if an I2C bus lock has occurred. This information will be received by the HW circuit 209 in real time. Based on this received information, the Hang_Alert signal is communicated to the BMC 201, even if the HW circuit is authorized to reset the I2C device 204.

According to another exemplary embodiment, the HW circuit 209 can receive a wake on LAN (WOL) signal based on the received signal, which can trigger the HW circuit 209 to send an alert to the BMC 201 to reset the hang device, i.e., the device causing the I2C bus hang.

In the event the HW circuit 209 is unable to clear the I2C bus hang or the HW circuit is not enabled to generate the RESET_Device signal, the BMC 201 then continues the find out process to determine the damage and report the information to the CPU 203 using Hang_Inform signal.

Thus, in this way, the BMC 201 is not required to continuously monitor the I2C device 204 but instead allows the HW circuit 209 to monitor the I2C device 204 and provide any hang alerts to the BMC 201 for further processing. Although the system of FIG. 2 shows a separate HW circuit 209, such a HW circuit may be incorporated into other elements of the system, such as the BMC 201, according to an exemplary embodiment.

Figure 3:
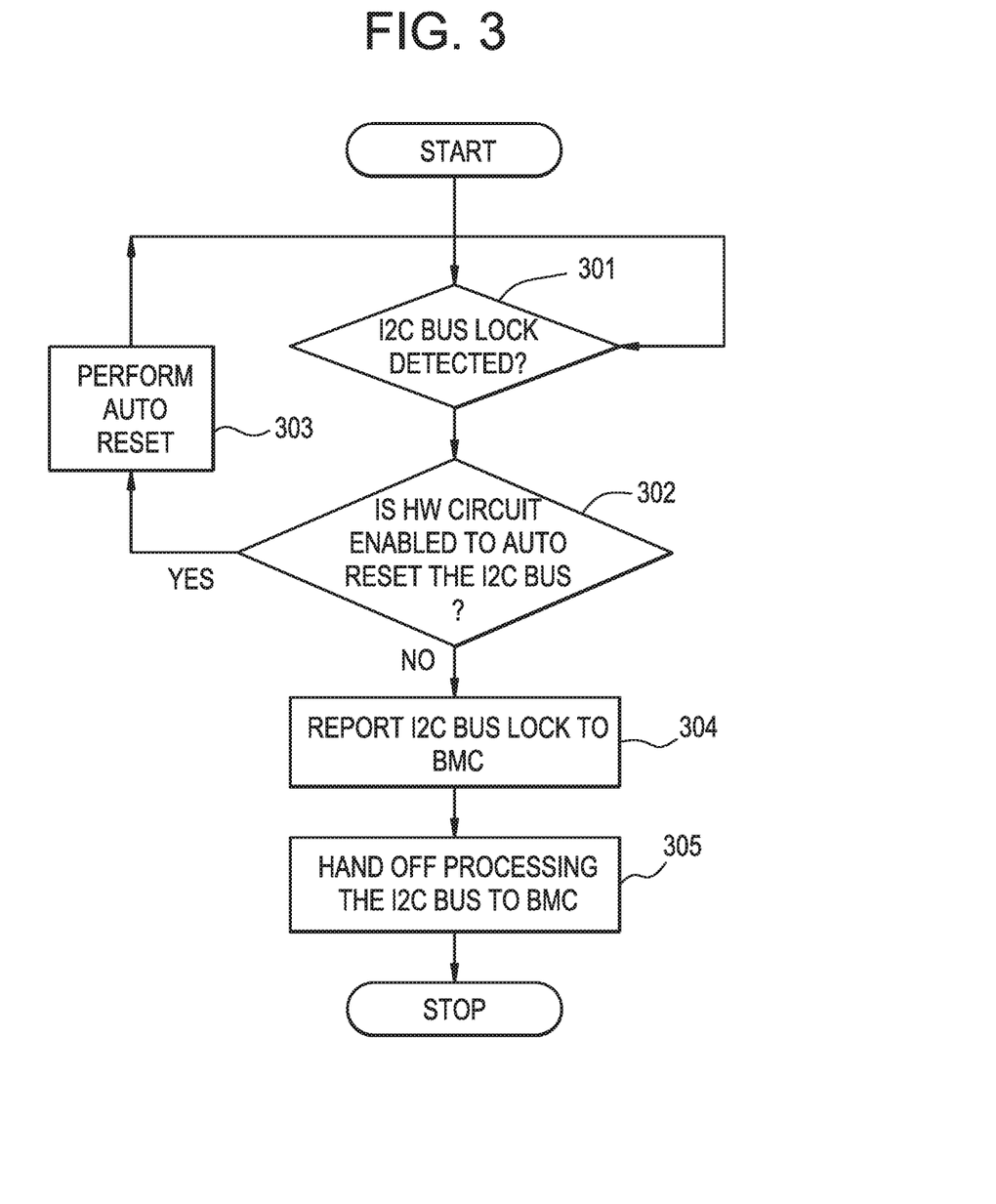
FIG. 3 illustrates a flow chart for detection of I2C bus status using the BMC and the HW circuit, according to an exemplary embodiment.

FIG. 3 illustrates a flow chart for detection of I2C bus status using a HW circuit, according to an exemplary embodiment.

The process starts at step 301, where an I2C bus lock is detected using the HW circuit. For example, referring to FIG. 2, the HW circuit 209 may detect an abnormality associated with the I2C_Monitor signal. Following detection of the I2C bus lock, the HW circuit determines if it can auto reset the I2C device. For example, referring to FIG. 2, the HW circuit 209 determines whether it has received a reset_EN signal from the BMC 201.

If it is determined that the HW circuit can auto reset the I2C device, the HW circuit sends the reset signal at step 303 and the process goes back to step 301 to monitor for future I2C bus lock. However, if it is determined that the HW circuit cannot auto reset the I2C device, the HW circuit reports the I2C bus lock to the BMC in step 304. For example, as discussed above, the HW circuit 209 can transmit a Hang_Alert signal back to the BMC 201.

Lastly, in step 305, further processing of the I2C bus failure is handed off to the BMC. The processing may further include resetting and troubleshooting, using the BMC, any I2C devices connected to the I2C bus.

This processing in step 305 may further include informing, using the BMC, the processing results to a CPU and recording the failed channels in the CPU. Further detail regarding the processing of the I2C bus failure via the BMC is provided below, with reference to FIG. 4.

Figure 4:
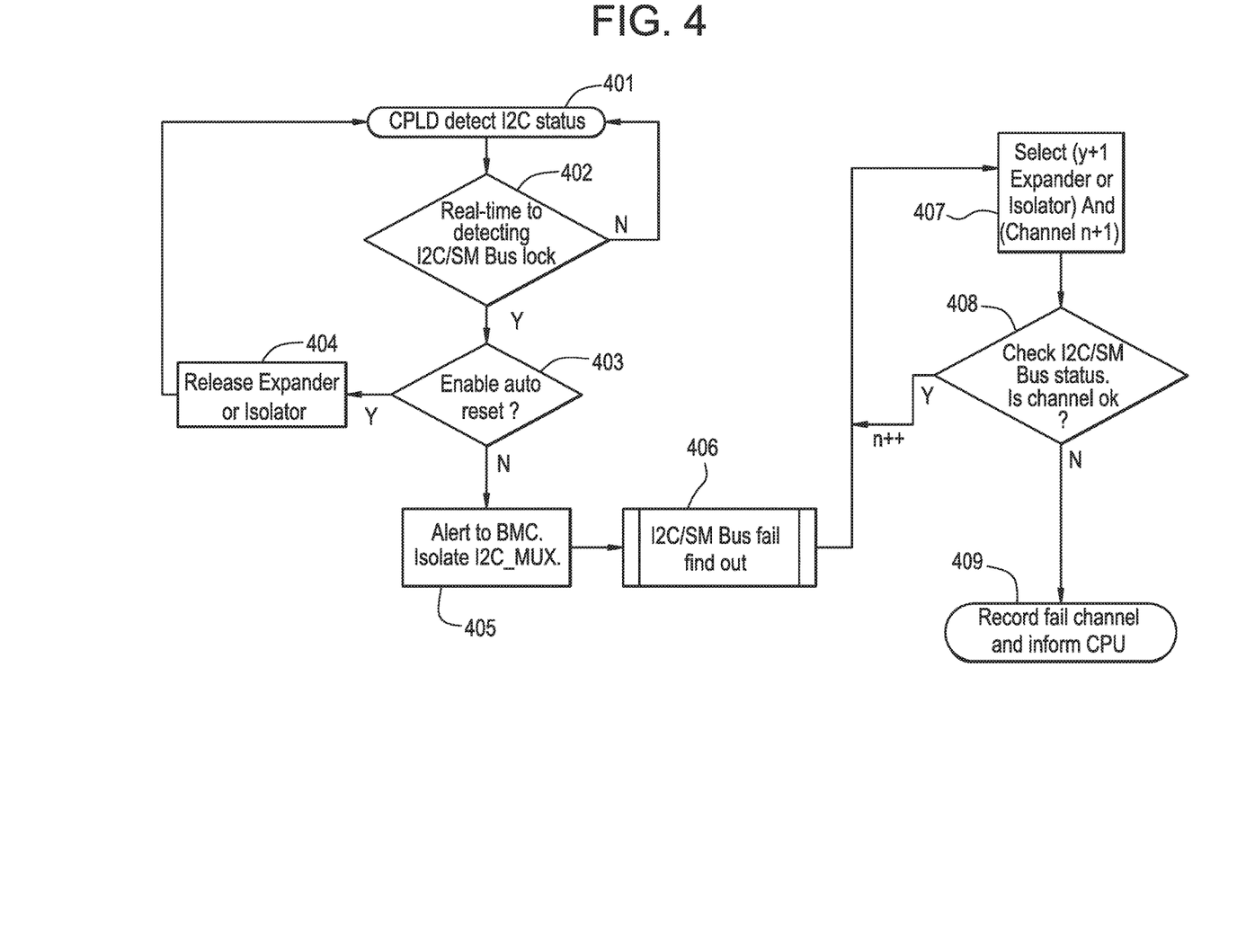
FIG. 4 illustrates a flow chart for detection of I2C bus status using the BMC and the HW circuit, according to another exemplary embodiment.

FIG. 4 illustrates a flow chart for detection of I2C bus status using the BMC and the HW circuit, according to another exemplary embodiment.

The process starts at step 401, where a HW circuit in the system, such as via a CPLD device in the system, detects the I2C bus status. In step 402, it is determined if an I2C/SM bus lock is taking place. If it is not, the process repeats step 401, where the HW circuit continues to monitor the I2C bus status.

If, however, detection of an I2C/SM bus lock is detected at step 402, the process moves to step 403, where a determination regarding whether the HW circuit is enabled to perform the auto reset of the I2C device. If the HW circuit is enabled to auto reset the I2C device, the I2C expander or isolator device is released or reset in step 404 and then the process returns to step 401 where the HW circuit detects I2C status. This process is similar to that of FIG. 3.

However, if the HW circuit is not enabled to auto reset the I2C device in step 403, the process moves to step 405, where the HW circuit sends an alert to BMC and the BMC then performs the I2C/SM Bus fail find out processing starting at step 406.

The find out process performed by the BMC is run through a loop where each I2C expander or isolator device, as well as any channels associated therewith, are selected one by one, in step 407, and the I2C/SM bus status is checked to determine if the channel is OK (i.e., not causing the I2C bus hang) in step 408. If it is determined that the channel is OK in step 408, the process goes back to step 407, where the next I2C device and/or channel is selected, followed by checking to determine if the channel is OK (i.e., not causing the I2C bus hang) in step 408. In some embodiments, the BMC can also be used to try and reset the I2C device to clear the I2C bus lock by resetting the device and/or channel causing the I2C bus lock.

This process is performed for all I2C expander or isolator devices and all channels thereof. When it is determined that a device or channel thereof is not OK in step 408, such information is sent to the CPU and is recorded in step 409. Such information can be maintained in a log for future use. Alternatively, the information can be used by the CPU to generate alerts for users.

Figure 5:
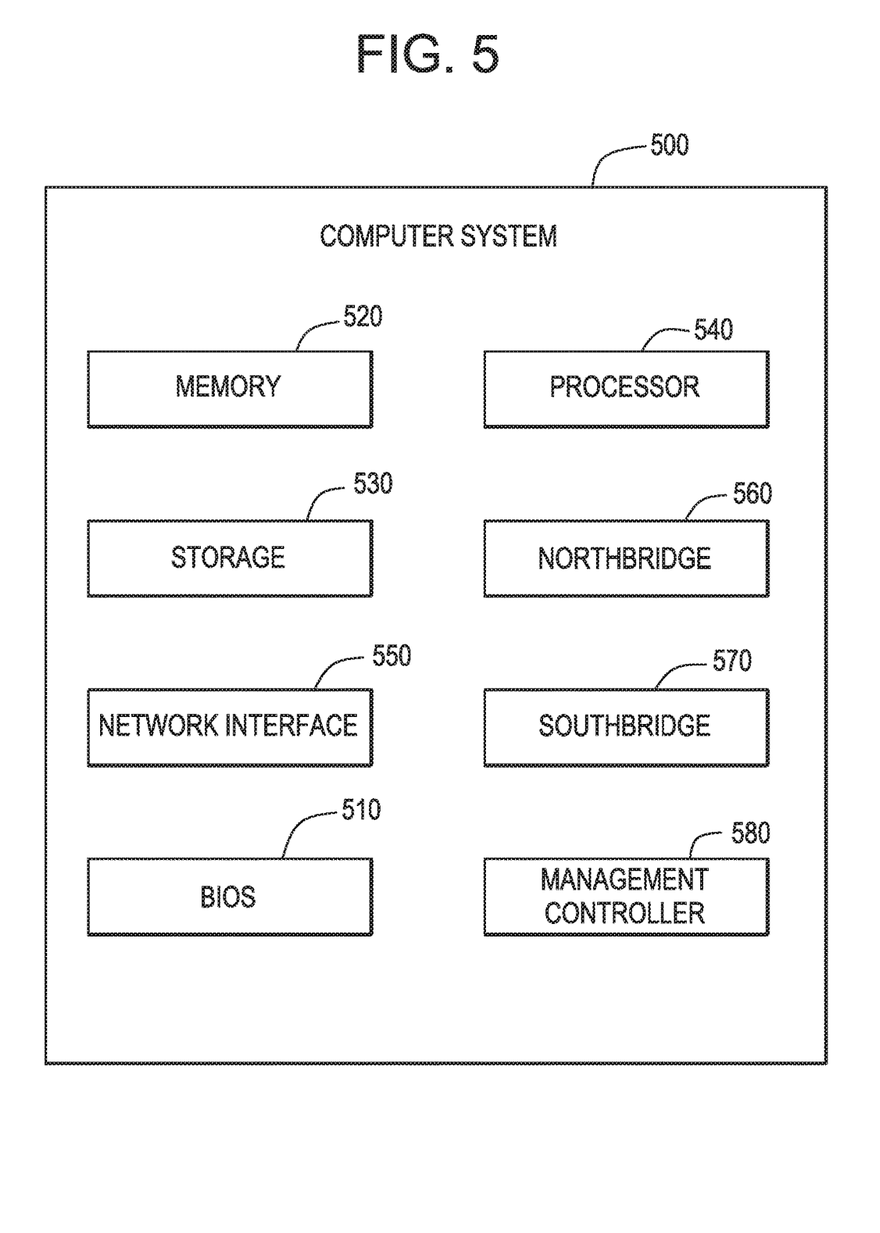
FIG. 5 illustrates a block diagram of an example computer system.

FIG. 5 illustrates a block diagram of an example computer system 500. The computer system 500 can include a processor 540, a network interface 550, a management controller 580, a memory 520, a storage 530, a Basic Input/Output System (BIOS) 510, a Northbridge 560, and a Southbridge 570.

The computer system 500 can be, for example, a server (e.g., one of many rack servers in a data center) or a personal computer. The processor (e.g., central processing unit (CPU)) 540 can be a chip on a motherboard that can retrieve and execute programming instructions stored in the memory 520. The processor 540 can be a single CPU with a single processing core, a single CPU with multiple processing cores, or multiple CPUs. One or more buses (not shown) can transmit instructions and application data between various computer components such as the processor 540, memory 520, storage 530, and networking interface 550.

The memory 520 can include any physical device used to temporarily or permanently store data or programs, such as various forms of random-access memory (RAM). The storage 530 can include any physical device for non-volatile data storage such as a HDD or a flash drive. The storage 530 can have a greater capacity than the memory 520 and can be more economical per unit of storage, but can also have slower transfer rates.

The BIOS 510 can include a Basic Input/Output System or its successors or equivalents, such as an Extensible Firmware Interface (EFI) or Unified Extensible Firmware Interface (UEFI). The BIOS 510 can include a BIOS chip located on a motherboard of the computer system 500 storing a BIOS software program. The BIOS 510 can store firmware executed when the computer system is first powered on along with a set of configurations specified for the BIOS 510. The BIOS firmware and BIOS configurations can be stored in a non-volatile memory (e.g., NVRAM) 512 or a ROM such as flash memory. Flash memory is a non-volatile computer storage medium that can be electronically erased and reprogrammed.

The BIOS 510 can be loaded and executed as a sequence program each time the computer system 500 is started. The BIOS 510 can recognize, initialize, and test hardware present in a given computing system based on the set of configurations. The BIOS 510 can perform self-test, such as a Power-on-Self-Test (POST), on the computer system 500. This self-test can test functionality of various hardware components such as hard disk drives, optical reading devices, cooling devices, memory modules, expansion cards and the like. The BIOS can address and allocate an area in the memory 520 to store an operating system. The BIOS 510 can then give control of the computer system to the OS.

The BIOS 510 of the computer system 500 can include a BIOS configuration that defines how the BIOS 510 controls various hardware components in the computer system 500. The BIOS configuration can determine the order in which the various hardware components in the computer system 500 are started. The BIOS 510 can provide an interface (e.g., BIOS setup utility) that allows a variety of different parameters to be set, which can be different from parameters in a BIOS default configuration. For example, a user (e.g., an administrator) can use the BIOS 510 to specify clock and bus speeds, specify what peripherals are attached to the computer system, specify monitoring of health (e.g., fan speeds and CPU temperature limits), and specify a variety of other parameters that affect overall performance and power usage of the computer system.

The management controller 580 can be a specialized microcontroller embedded on the motherboard of the computer system. For example, the management controller 580 can be a BMC or a RMC. The management controller 580 can manage the interface between system management software and platform hardware. Different types of sensors built into the computer system can report to the management controller 580 on parameters such as temperature, cooling fan speeds, power status, operating system status, etc. The management controller 580 can monitor the sensors and have the ability to send alerts to an administrator via the network interface 550 if any of the parameters do not stay within preset limits, indicating a potential failure of the system. The administrator can also remotely communicate with the management controller 580 to take some corrective action such as resetting or power cycling the system to restore functionality.

The Northbridge 560 can be a chip on the motherboard that can be directly connected to the processor 540 or can be integrated into the processor 540. In some instances, the Northbridge 560 and the Southbridge 570 can be combined into a single die. The Northbridge 560 and the Southbridge 570, manage communications between the processor 540 and other parts of the motherboard. The Northbridge 560 can manage tasks that require higher performance than the Southbridge 570. The Northbridge 560 can manage communications between the processor 540, the memory 520, and video controllers (not shown). In some instances, the Northbridge 560 can include a video controller.

The Southbridge 570 can be a chip on the motherboard connected to the Northbridge 560, but unlike the Northbridge 560, is not directly connected to the processor 540. The Southbridge 570 can manage input/output functions (e.g., audio functions, BIOS, Universal Serial Bus (USB), Serial Advanced Technology Attachment (SATA), Peripheral Component Interconnect (PCI) bus, PCI eXtended (PCI-X) bus, PCI Express bus, Industry Standard Architecture (ISA) bus, Serial Peripheral Interface (SPI) bus, Enhanced Serial Peripheral Interface (eSPI) bus, System Management Bus (SMBus), etc.) of the computer system 500. The Southbridge 570 can be connected to or can include within the Southbridge 570 the management controller 580, Direct Memory Access (DMAs) controllers, Programmable Interrupt Controllers (PICs), and a real-time clock.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

In one or more exemplary designs, the functions described can be implemented in hardware, software, firmware, or any combination thereof. If implemented in software, the functions can be stored on or transmitted over as one or more instructions or code on a non-transitory computer-readable medium. Non-transitory computer-readable media includes both computer storage media and communication media including any medium that facilitates transfer of a computer program from one place to another. A storage media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

What is claimed is:

1. A method of monitoring inter-integrated circuit (I2C) bus status, using a Baseboard Management Controller (BMC) and a hardware watchdog (HW) circuit of a system, the method comprising:
   detecting, using the HW circuit, a failure of an I2C bus, wherein the HW circuit is a separate circuit from the BMC and a CPU of the system;
   determining if the HW circuit is enabled to auto reset I2C devices on the I2C bus;
   in an event that the HW circuit is enabled to auto reset the I2C devices on the I2C bus, resetting, using the HW circuit, the I2C devices, and
   in an event that the HW circuit is not enabled to auto reset the I2C devices on the I2C bus:
      reporting, using the HW circuit, detected failure to the BMC; and
      processing, using the BMC, the detected failure.

2. The method of claim 1, wherein the determining further comprises:
   detecting, at the HW circuit, whether a reset enable signal was received from the BMC; and
   determining that the HW circuit is enabled to auto reset the I2C device if the reset enable signal was received.

3. The method of claim 1, wherein the detecting further comprises monitoring, using the HW circuit, the clock line/data line (SCL/SDA pin) of the I2C bus.

4. The method of claim 1, wherein the processing further comprises:

resetting, using the BMC, the I2C devices; and if the resetting of the I2C device fails to resolve the failure of the I2C bus, testing the I2C device to determine a cause of the failure of the I2C bus.

5. The method of claim 4, wherein the testing further comprises evaluating, in turn, each one of the I2C devices by:

isolating the selected one of the I2C devices;

checking the I2C bus status after the isolating; and recording, if it is determined for the one of the I2C devices that the I2C bus status is not OK, a failure for the one of the I2C devices.

6. The method of claim 5, wherein the evaluating is performed for all channels associated with a selected one of the I2C devices.

7. The method of claim 4, wherein the processing further comprises informing the processing results to a CPU.

8. A switch device, comprising:

a Baseboard Management Controller (BMC) of a system;

a hardware watchdog (HW) circuit, wherein the HW circuit is a separate circuit from the BMC and a CPU of the system;

an I2C bus for connecting I2C devices thereto;

a CPU; and wherein the HW circuit is configured for detecting, using the HW circuit, a failure of the I2C bus, determining if the HW circuit is enabled to auto reset I2C devices on the I2C bus, resetting, using the HW circuit, the I2C devices in an event that the HW circuit is enabled to auto reset the I2C devices on the I2C bus, reporting, using the HW circuit, detected failure to the BMC in an event that the HW circuit is not enabled to auto reset the I2C devices on the I2C bus, and processing, using the BMC, the detected failure.

9. The switch device of claim 8, wherein the HW circuit is further configured for detecting, at the HW circuit, whether a reset enable signal was received from the BMC, and determining that the HW circuit is enabled to auto reset the I2C devices if the reset enable signal was received.

10. The switch device of claim 8, wherein the HW circuit is further configured to monitor the clock line/data line (SCL/SDA pin) of the I2C bus.

11. The switch device of claim 8, wherein the BMC is further configured for resetting the I2C devices, and if the resetting of the I2C devices fails to resolve the failure of the I2C bus, testing the I2C devices to determine a cause of the failure of the I2C bus.

12. The switch device of claim 8, wherein the testing further comprises evaluating, in turn, each one of the I2C devices by;

isolating the one of the I2C devices;

checking the I2C bus status after the isolating; and recording, if it is determined for the one of the I2C devices that the I2C bus status is not OK, a failure for the one of the I2C devices.

13. The switch device of claim 12, wherein the BMC is configured to, if it is determined that the HW circuit is not enabled to auto reset the I2C bus, process the I2C bus failure for all channels associated with the at least one of the I2C expander and the I2C isolator.

14. The switch device of claim 11, wherein the BMC is further configured to report the processing results to the CPU.

* * * * *